US006772876B2

(12) United States Patent
Spangenberg

(10) Patent No.: US 6,772,876 B2
(45) Date of Patent: Aug. 10, 2004

(54) CONVEYOR CHAIN LINK HAVING MOVABLE GRIPPER AND CONVEYOR SYSTEM UTILIZING SAME

(75) Inventor: Thomas Spangenberg, Baltimore, MD (US)

(73) Assignee: AMBEC, Inc., Owings Mills, MD (US)

( * ) Notice: Subject to any disclaimer, the term of this patent is extended or adjusted under 35 U.S.C. 154(b) by 0 days.

(21) Appl. No.: 10/189,291

(22) Filed: Jul. 2, 2002

(65) Prior Publication Data

US 2003/0047427 A1 Mar. 13, 2003

Related U.S. Application Data

(60) Provisional application No. 60/302,642, filed on Jul. 2, 2001.

(51) Int. Cl.[7] .............................................. B65G 29/00
(52) U.S. Cl. ........................... 198/867.02; 198/867.06; 198/867.15
(58) Field of Search ....................... 198/867.02, 867.06, 198/867.08, 867.15, 867.14

(56) References Cited

U.S. PATENT DOCUMENTS

| | | | | |
|---|---|---|---|---|
| 1,124,168 A | * | 1/1915 | Pope | 198/867.15 |
| 3,469,675 A | * | 9/1969 | Scanlon | |
| 3,513,964 A | * | 5/1970 | Imse | 198/852 |
| 3,987,888 A | * | 10/1976 | Wickam | 198/802 |
| 4,351,429 A | * | 9/1982 | Garvey | 198/690.2 |
| 4,809,846 A | * | 3/1989 | Hodlewsky et al. | 198/853 |
| 4,941,561 A | * | 7/1990 | Yamabe et al. | 198/890.1 |
| 5,000,311 A | * | 3/1991 | Abbestam et al. | 198/867.14 |
| 5,090,557 A | * | 2/1992 | Carmen | 198/626.1 |
| 5,219,065 A | * | 6/1993 | Hodlewsky et al. | 198/853 |
| 5,323,893 A | * | 6/1994 | Garbagnati | 198/690.2 |
| 5,429,226 A | * | 7/1995 | Ensch et al. | 198/803.14 |
| 5,497,874 A | * | 3/1996 | Layne | 198/698 |
| 5,507,383 A | * | 4/1996 | Lapyere et al. | 198/853 |
| 5,630,499 A | * | 5/1997 | Louden et al. | 198/867.14 |

* cited by examiner

Primary Examiner—Richard Ridley
(74) Attorney, Agent, or Firm—Benesch, Friedlander, Coplan & Aronoff LLP

(57) ABSTRACT

A chain link comprising an elongated body having opposed first and second ends defining a longitudinal axis therebetween. The body has guide shoes that project from a bottom portion of the body for supporting the link on a track. The chain link further includes a gripping member that has a structure that is in sliding engagement with a cooperating structure disposed along the body of the link. The cooperating structure permits the gripping member to move relative to the body in a direction parallel to the longitudinal axis of the body.

31 Claims, 17 Drawing Sheets

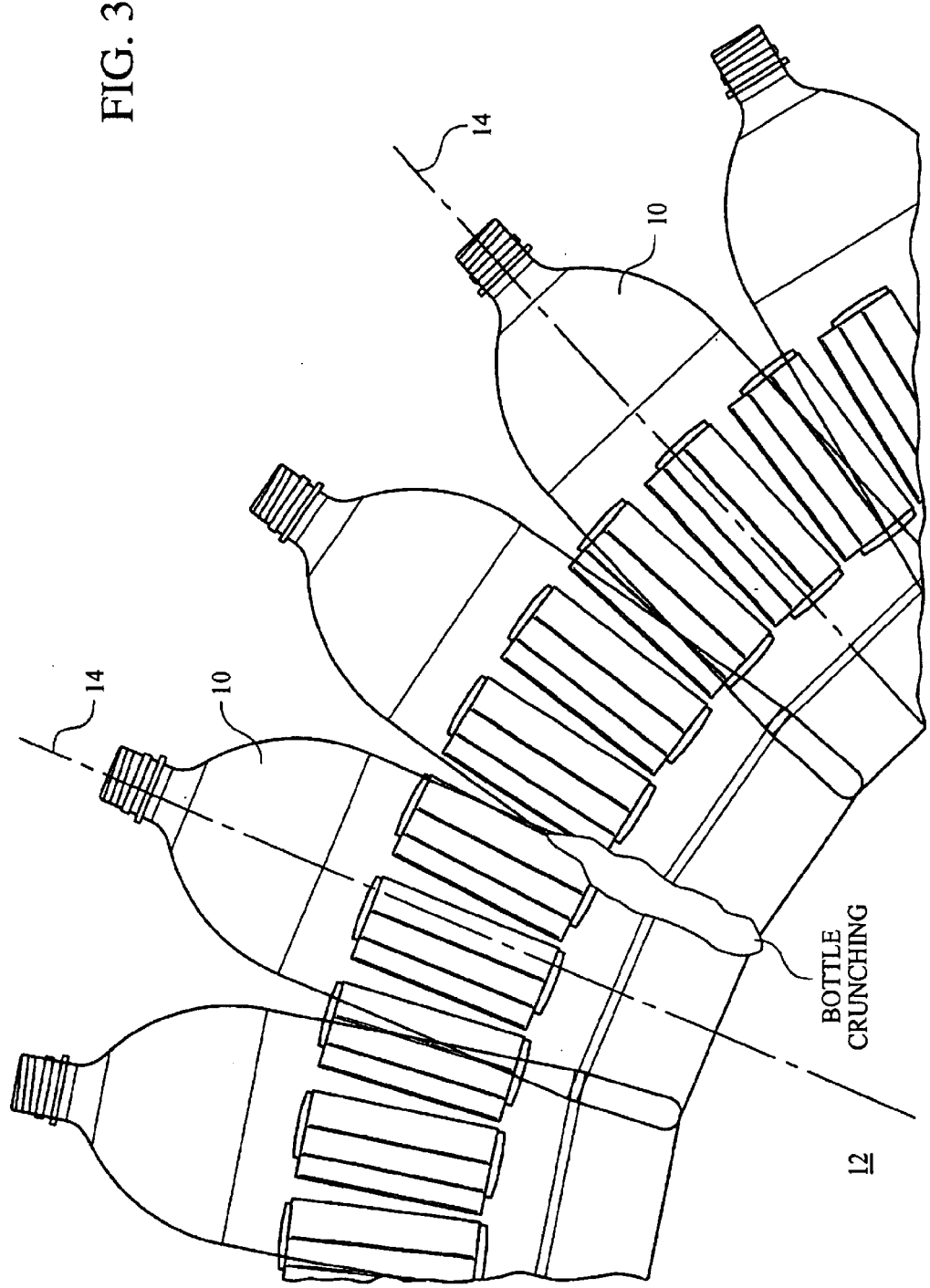

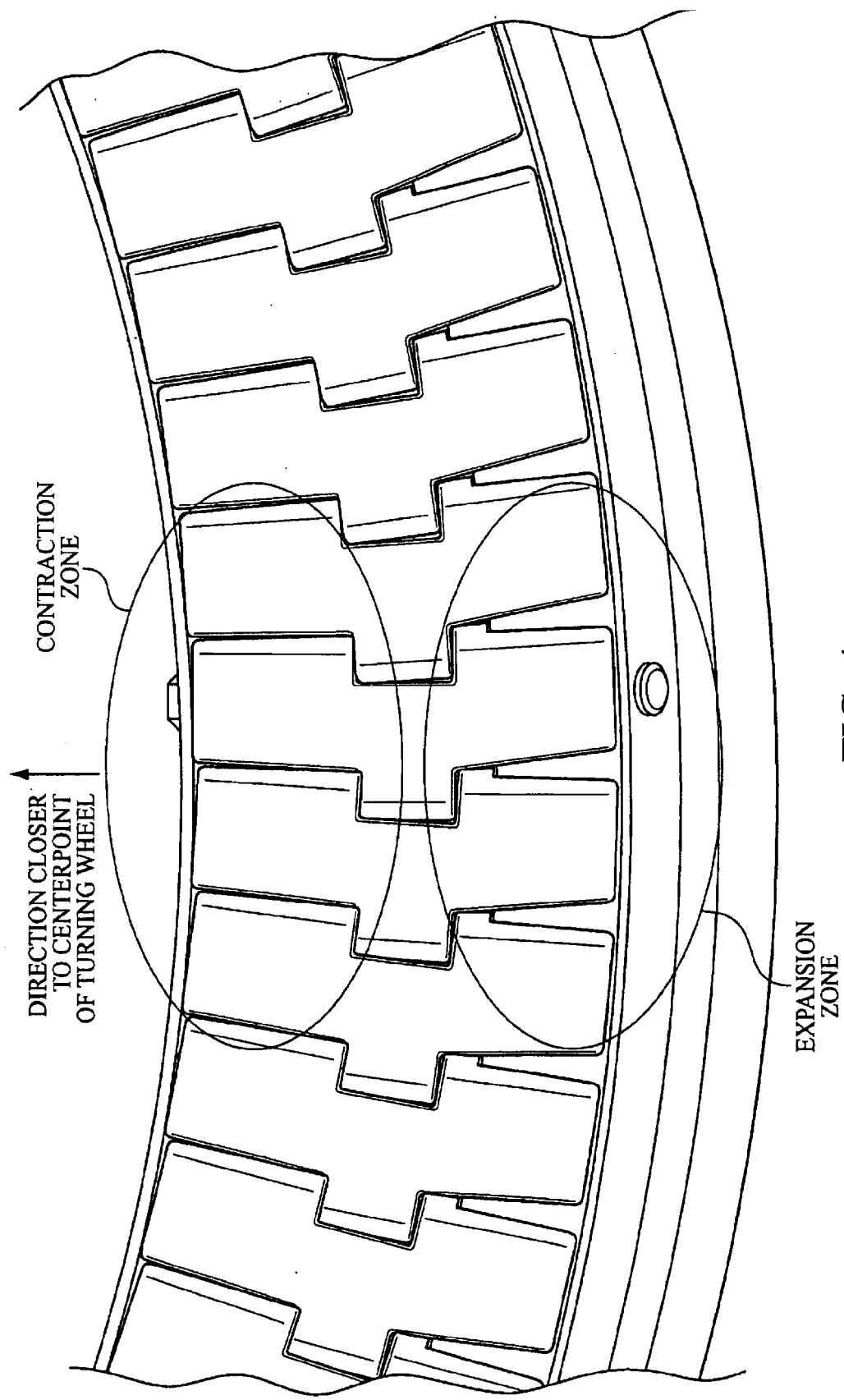

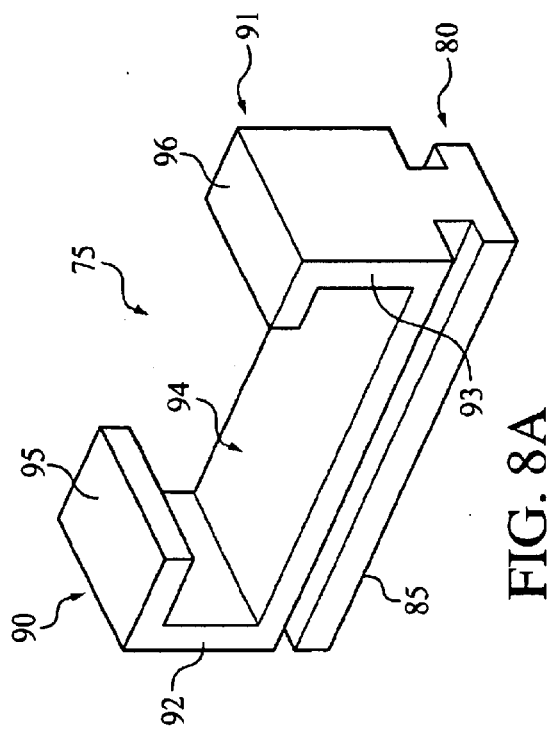
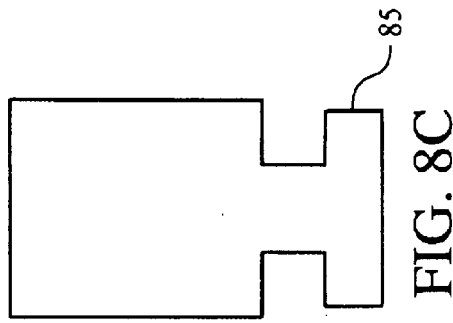
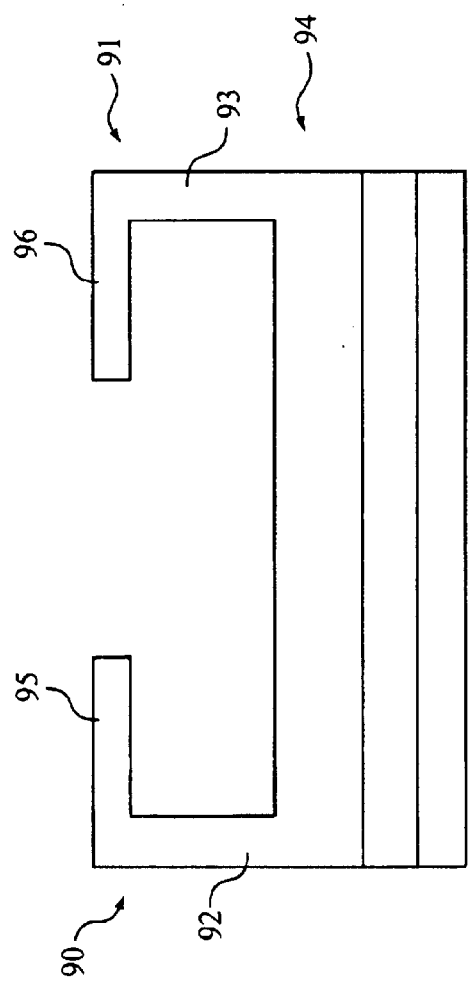
FIG. 8A
FIG. 8B
FIG. 8C

CONVEYOR CHAIN LINK HAVING MOVABLE GRIPPER AND CONVEYOR SYSTEM UTILIZING SAME

CROSS-REFERENCE TO RELATED APPLICATIONS

This application claims the benefit of U.S. Provisional Application No. 60/302,642 filed on Jul. 2, 2001.

BACKGROUND OF THE INVENTION

This invention relates to conveyor chain and, more particularly, to an improved conveyor chain for use in a product capturing conveyor.

Product capturing chains have been used in the past for elevating articles from one level to another in a conveyor system. Many companies currently design machines for conveying articles during manufacture, labeling, etc. One such particular machine is a rinsing machine (or "rinser") of many configurations and designs (for example, "high-in/low-out" shown in FIG. 1 and "low-in/low-out" shown in FIG. 2 configurations, elevator/lowerator machines, and head space sterilizer machines). The disclosure herein will describe this invention with particular reference to a rinser. However, it is an intention herein to utilize the technology disclosed herein not only across the entire family of rinsing machines, but in all areas of conveyance machines and in other areas where movement along a conveyor line is useful.

It is known in the art to manufacture rinsers which are designed to rinse bottles with water and/or ionized air in preparation for being filled. The basic mode of operation involves receiving bottles from a standard tabletop conveyor or an air conveyor in a single file orientation and then gripping the bottles with dual strands of a "gripper chain" (for example a Rexnord LF1873G gripper chain) or similar gripper chains running parallel to each other. Once in the rinser, the bottles are inverted while held by the chains by riding along large diameter curved tracks or turning wheels and then being subjected to multiple streams of water and/or ionized air while in an inverted position. Inverting the bottle allows contaminants as well as any water being used in the process to exit the bottle via the opening in the bottle top. The bottles remain inverted in the rinsing machine for distances of up to 20 ft. to allow water to completely drain from the bottle before being turned upright again at the opposite end of the machine. The bottles are returned to the upright position in the same manner in which they were inverted, with a second set of turning wheels or curved tracks at the opposite end of the machine. The bottles exit the rinser in a single file orientation upon being released by the rinser gripper chain to standard tabletop conveyors or air conveyors.

With particular reference to FIG. 3, inherent to the function of inverting bottles 100 with turning wheel 12 is the geometric problem involved in the inversion. As the chain follows the contour of the turning wheel 12, the vertical centerlines 14 of the bottles 100 align themselves to point at the axis of rotation (i.e., center point) of the turning wheel 12. And because bottles 100 are gripped/constrained at about their midpoint during movement around the turning wheel 12, the distance between their vertical centerlines increases at points further from the center point of the turning disc 12 and decreases at points nearer the center point of the turning wheel 12. Therefore, if bottles 100 enter the rinser "body-to-body" (aligned touching each other with vertical centerlines parallel), the portion of the bottles 100 closer to the center point of the tuning disc will interfere with one another causing crunching, denting, or damage as shown in FIG. 3. FIG. 4 shows a chain wherein the portion of chain closer to the center point of turning wheel 12 creates a "contraction zone" and the portion of chain further from the center point of turning wheel 12 creates a "expansion zone".

The prior art attempts to avoid such damage by "metering" the bottles before they enter the rinser. Metering supplies a space or gap between the bottles as they enter the rinser ("gapping"). Providing space between the bottles as they enter the rinser allows the bottles to progress through the turning disc and not interfere with each other in the "contraction zone". However, gapping the bottles creates several undesirable conditions in the functioning of the machine. Such undesirable conditions include requiring metering equipment, increasing the running speed of the rinser to compensate for the gaps between bottles, and wasting water/air between the gaps in the bottles.

The present invention seeks to eliminate the undesirable conditions caused by "gapping" in conventional rinsers or other conveyance machines by providing an improved conveyor chain having movable grippers that move in a direction relative to the axis of rotation of a turning wheel or relative to the center point of a curved track (defined by the curved track's radius of curvature) to provide clearance for bottles as they travel around the turning wheel or curved track.

SUMMARY OF THE INVENTION

The present invention provides a chain link having a movable gripper where the chain link comprises a carrier member having a top portion and a gripper slidably engaged with the top portion of said carrier member. The carrier member has a bottom portion that includes means for supporting the chain link on a track. The top portion of the carrier body includes a groove that extends along at least a portion of the length of the carrier member. The gripper includes a base portion having a corresponding tongue to engage the groove in the carrier member. Alternatively, the gripper includes a base portion having a groove that extends along at least a portion of the base portion of the gripper. Hence, the top portion of the carrier member has a corresponding tongue that extends along at least a portion of the length of the carrier member to engage the groove in the base portion of the gripper.

In another embodiment, a conveyor system for moving articles comprises a conveyor including a chain having a plurality of links that follows a track defining a travel path. The travel path includes a curved portion having a radius of curvature defining a center point. Each link has a gripping member in sliding engagement with the link wherein the gripping member is movable relative to the link. Each link includes means for supporting the link in said track wherein the link follows the travel path of the track. The chain includes a proximal portion that is closer to the center point of the curved portion and a distal portion that is farther from the center point of the curved portion wherein the proximal portion defines a contraction zone and the distal portion defined an expansion zone when the chain travels around the curved portion. The conveyor system includes means means for moving each gripping member into the expansion zone before each respective link travels along the curved portion of said track.

The present invention also provides for a conveyor system comprising a conveyor including a chain having a plurality of links that follows a track defining a travel path. The track includes a curved portion such a turning wheel or curved track having a radius of curvature defining a center point. Each link includes means for supporting the link in the track wherein the link follows the travel path of the track. Each link also includes a gripping member that is in sliding engagement with the link wherein the gripping member is movable relative to the link. The conveyor system further comprises an urging mechanism positioned along the track to move each gripping member in a direction relative to the center point of the curved portion when each gripping member reaches the urging mechanism. The urging mechanism may comprise a guide bar to move the gripper member in a direction relative to the track and/or relative to the center point of the curved portion. Preferably, the guide bar is positioned along a portion of the track before the curved portion to move the gripper members in a direction away from the center point of the curved thereby moving the gripping members entirely in the expanded zone prior to reaching the curved portion of the track. This will ensure that no "bottle crunching" takes place as the bottles travel around the curved surface. The guide bar may extend around the perimeter of the curved portion of the track to maintain the gripper member in the expanded position. The urging mechanism may comprises a cam positioned adjacent the curved portion of the track and the gripping member defines the cam follower. Alternatively, a member may extend from the gripper defining the cam follower.

There are several advantages of this invention as compared to conventionally designed rinsers. Most notable is the reduction in running speed of the rinser as a result of eliminating the gaps between bottles, which allows the rinser to achieve the same throughput at a lower chain speed. The lower running speed results in lower wear on machine components and reduced maintenance downtime and costs. In addition, the elimination of the need to create gaps between bottles results in the elimination of requiring metering equipment prior to bottles entering the rinser. Another advantage of this invention is better rinsing of the bottles due to the slower speed of the bottles through the rinsing area. The lack of gaps between the bottles also results in a reduction in the amount of water and/or air required to rinse the bottles and the costs associated with supplying these, as well as a reduction in the amount water drained reducing associated sewage costs.

BRIEF DESCRIPTION OF THE DRAWINGS

These and other features, aspects, and advantages of the present invention will become better understood with regard to the following description, appended claims, and accompanying drawings where:

FIG. 3 is a side view of a chain that undergoes bottle crunching caused by the contraction on the chain as the chain goes around a curve;

FIG. 4 illustrates the "contraction zone" and "expansion zone" in a typical chain;

FIGS. 8A–8C illustrate various views of sliding member 75 according to the present invention;

DETAILED DESCRIPTION OF THE INVENTION

Figure 1:
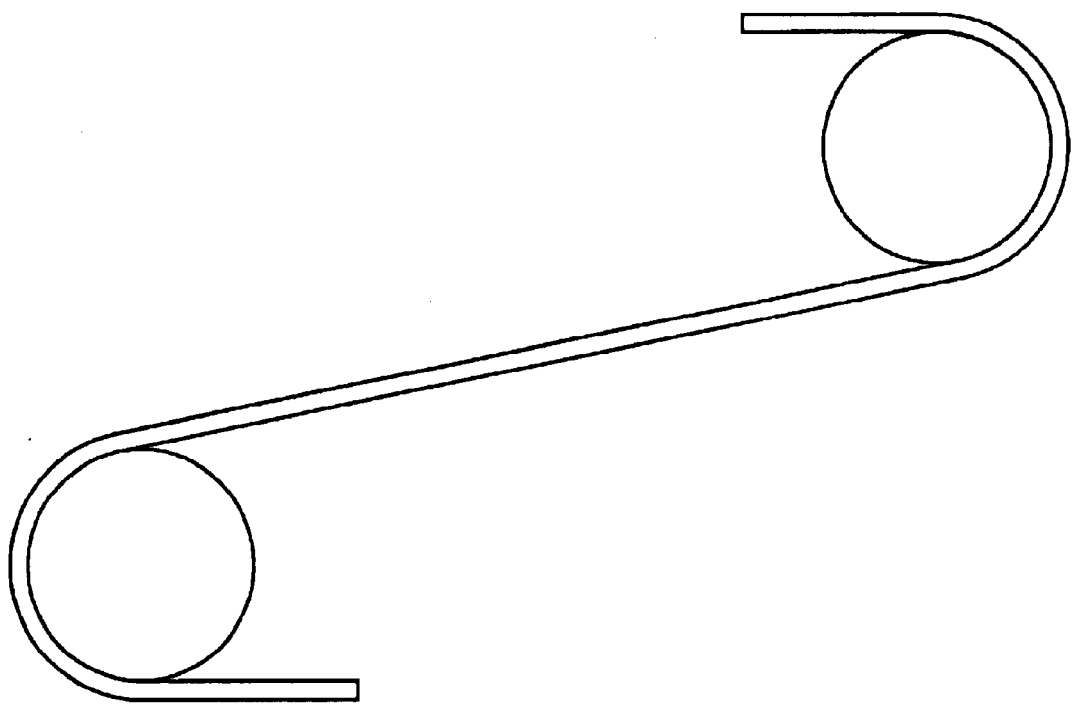
FIG. 1 is a schematic view of the conveyor orientation in a typical High-In/Low-Out rinser.
Figure 2:
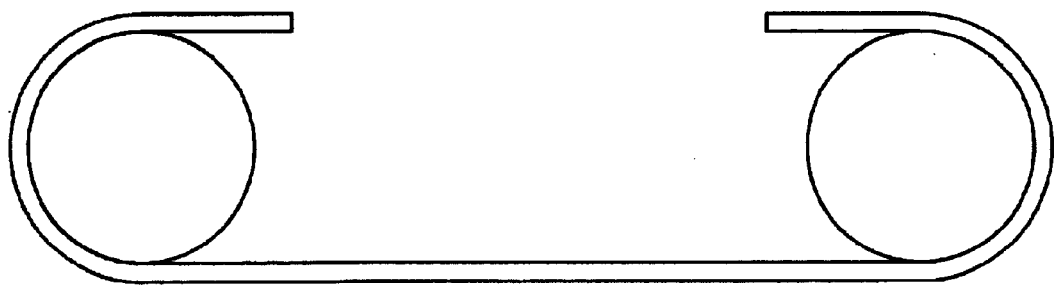
FIG. 2 is a schematic view of the conveyor orientation in a typical Low-In/Low-Out rinser.
Figure 5A:
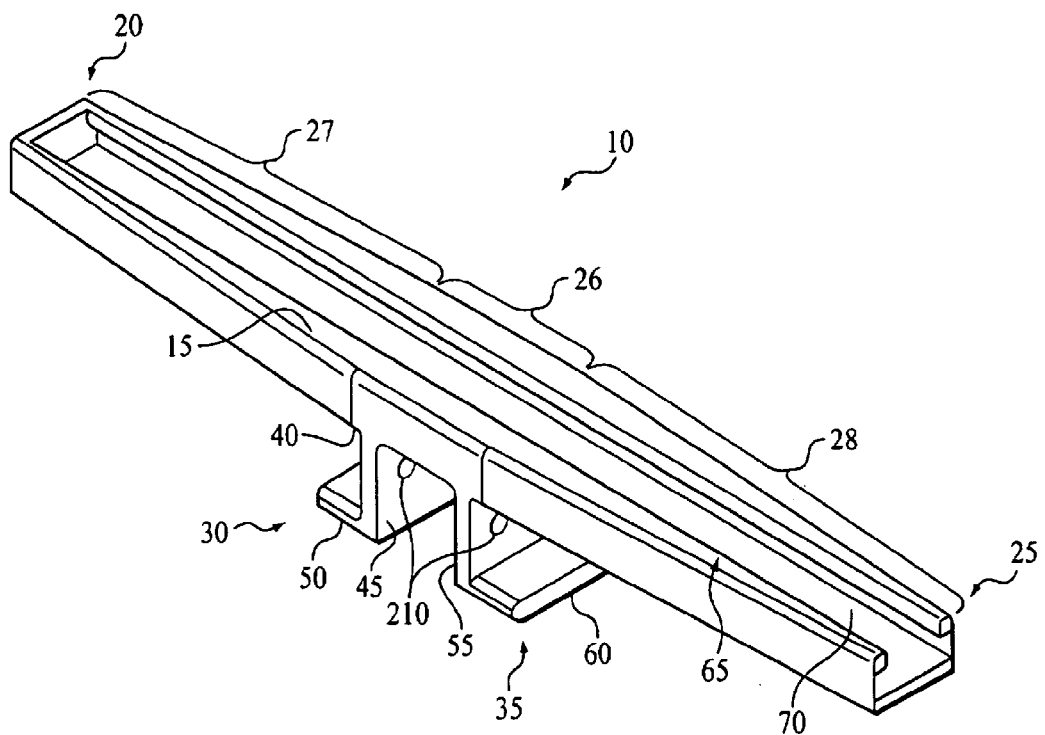
FIGS. 5A–5D illustrate various views of the chain link 10 according to the present invention.
Figure 5B:
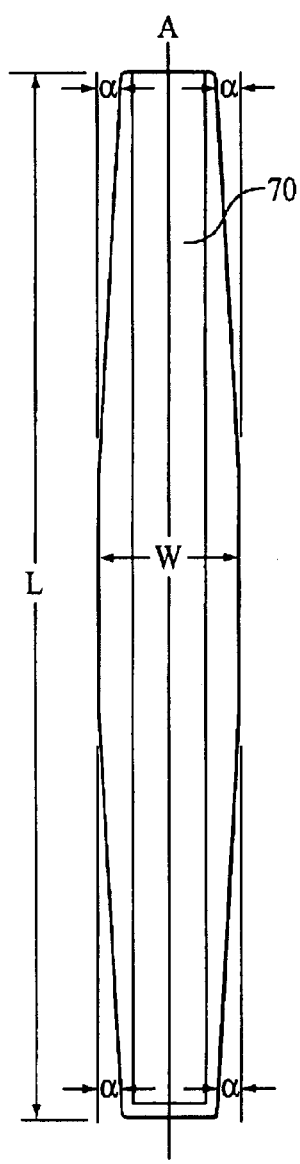
Figure 5C:
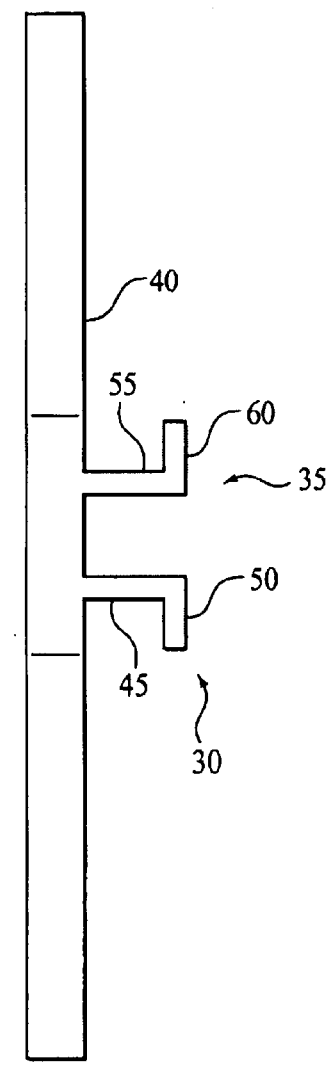
Figure 5D:
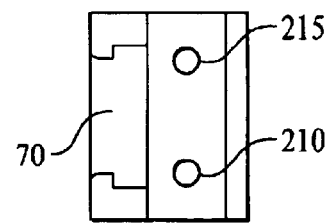

As shown in FIGS. 5A–5D, the present invention provides for an improved conveyor chain link 10 comprising an elongated body or carrier member 15 (herein after referred to as "body") that defines an axis A that extends longitudinally along the length of body 15 between a first end 20 and a second end 25. As shown in FIGS. 5A–5D, body 15 has a generally rectangular shape, but may be configured in any conceivable shape. Preferably, the length of body 15 includes an intermediate portion 26, a first tapered portion 27, and a second tapered portion 28. Intermediate portion 26 of body 15 has a width equal to W and is disposed at or near the midpoint of length L of body 15. Each side of first tapered portion 27 extends from intermediate portion 26 towards first end 20 at an angle α such that the width of first tapered portion 27 is less than W. Likewise, each side of second tapered portion 28 extends from intermediate portion 26 towards second end 25 at an angle α such that the width of second tapered portion 28 is less than W. The first and second tapered portions 27, 28 allow for expansion and contraction of the conveyor chain as it moves around a curved portion. Axis A is generally perpendicular to the direction of chain travel.

Guide shoes 30, 35 are projected from bottom portion 40 of body 15 to support link 10 on a track. Although guide shoes 30, 35 may be separate parts that are attached to bottom portion 40 of body 15, it is preferred that guide shoes 30, 35 and body 15 are one integral part. If guide shoes 30, 35 are separate parts, they may be attached to carrier member 15 by any means known in the art such as a weld joint (if parts are metal), rivet joint, pin joint, or screw joint. The general concept of guide shoes is detailed in U.S. Pat. No. 3,513,964, which is hereby incorporated by reference in its entirety herein. It can be seen clearly in FIG. 7 that guide shoe 30 includes a first portion 45, which is substantially perpendicular to bottom portion 40 and to axis A, and a second portion 50 that extends from first portion 45 in a direction towards the second end 25 of body 15. Preferably, second portion 50 is substantially parallel to bottom portion 40. Further, guide shoe 35 includes a first portion 55, which is substantially perpendicular to bottom portion 40 and to axis A, and a second portion 60 that extends from first portion 55 in a direction towards the first end 20 of body 15. Preferably, second portion 60 is substantially parallel to bottom portion 40. In a product capturing conveyor, the chain runs in the position shown in FIG. 5C, with the chain standing on end. In this position, the lower guide shoe 30 rides on a track or rail, with the first portion 45 of that guide shoe 30 supporting the weight of the chain on the rail as the chain is driven by sprockets (not shown). The upper guide shoe 35 also fits over a track or rail, with the second portion 60 of that guide shoe 35 serving to maintain link 10 in a vertical position.

Figure 6A:
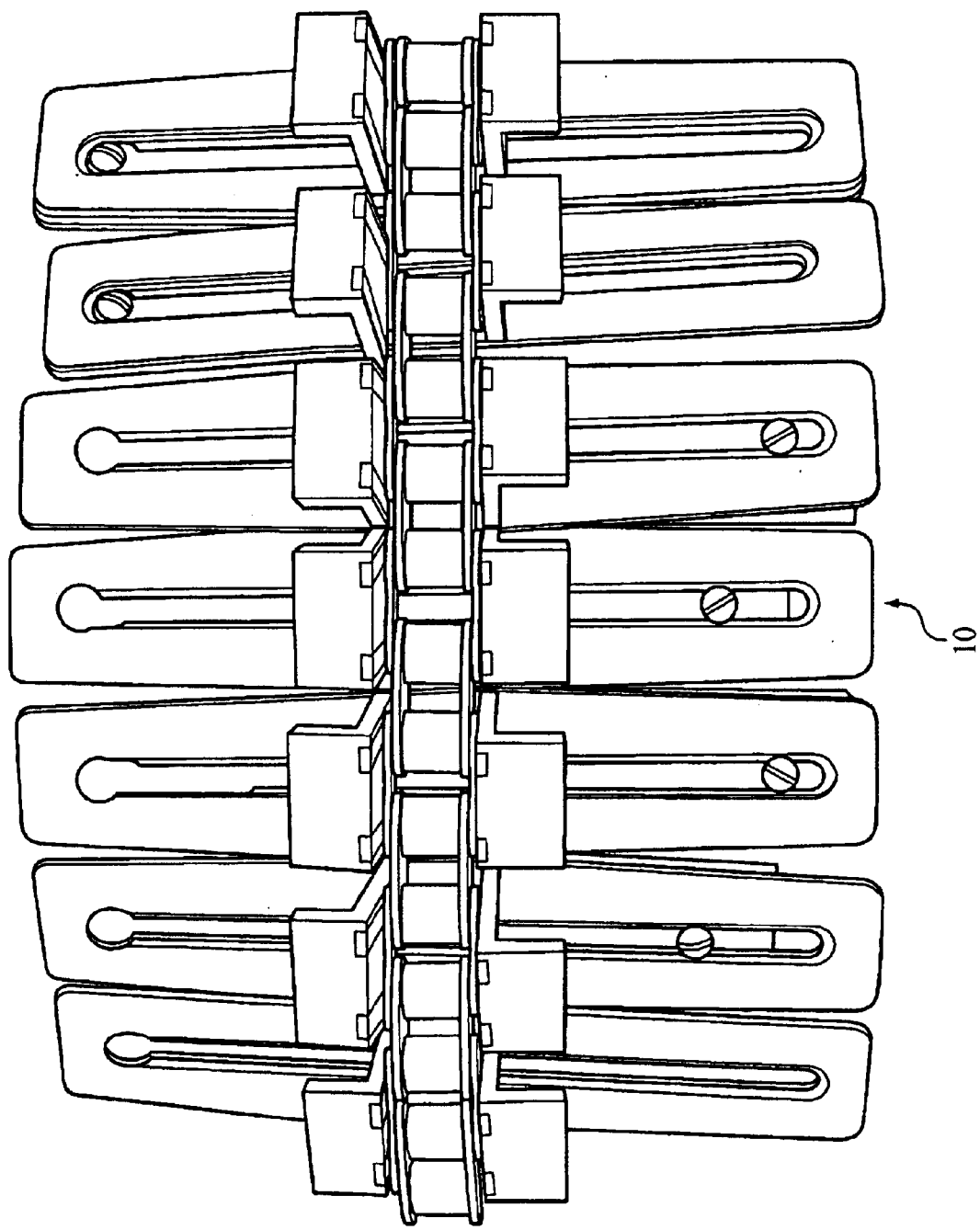
FIGS. 6A–6B illustrate various views of an alternate embodiment of chain link 10 according to the present invention.
Figure 6B:
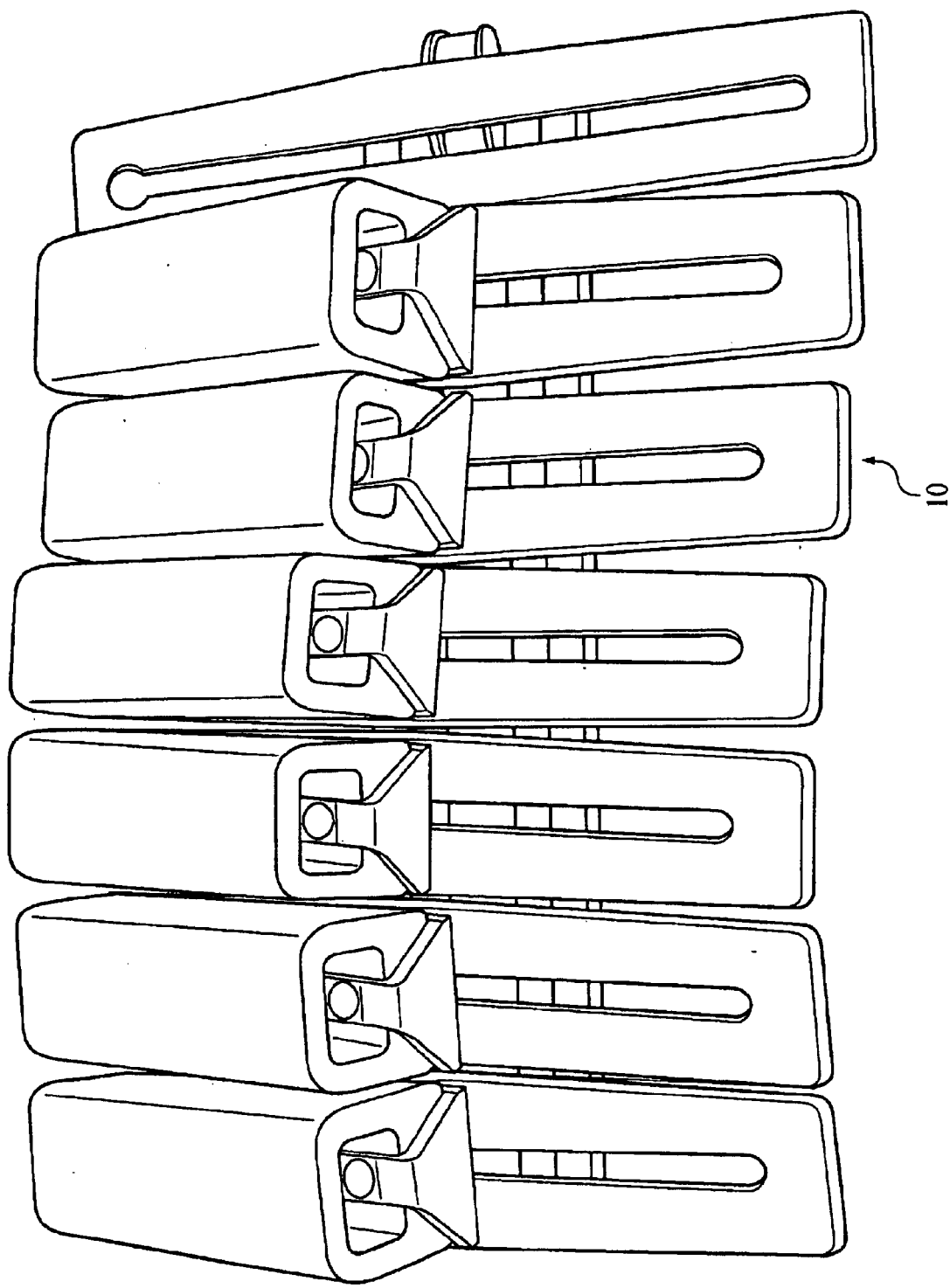

The top portion 65 of body 15 includes a structure defined by a groove or channel 70 that extends longitudinally along a substantial portion of the length of body 15. Although the preferred structure is a receiving structure that defines a groove or channel, other receiving structures are within the scope of the present invention including, but not limited to, a slot, rack and pinion, or any other female structure. Preferably, the groove or channel 70 has a T-shaped profile; however, groove or channel 70 may have a simple rectangular profile or any other shape. Alternatively, body 15 may include a slot that extends longitudinally along a substantial portion of the length of body and through the entire thickness of body 15 as shown in FIGS. 6A–6B. In this embodiment, the guide shoes may be slightly modified or the slot may be counter-bored to permit clearance of a cooperating structure that is in sliding engagement with body 15.

Figure 7:
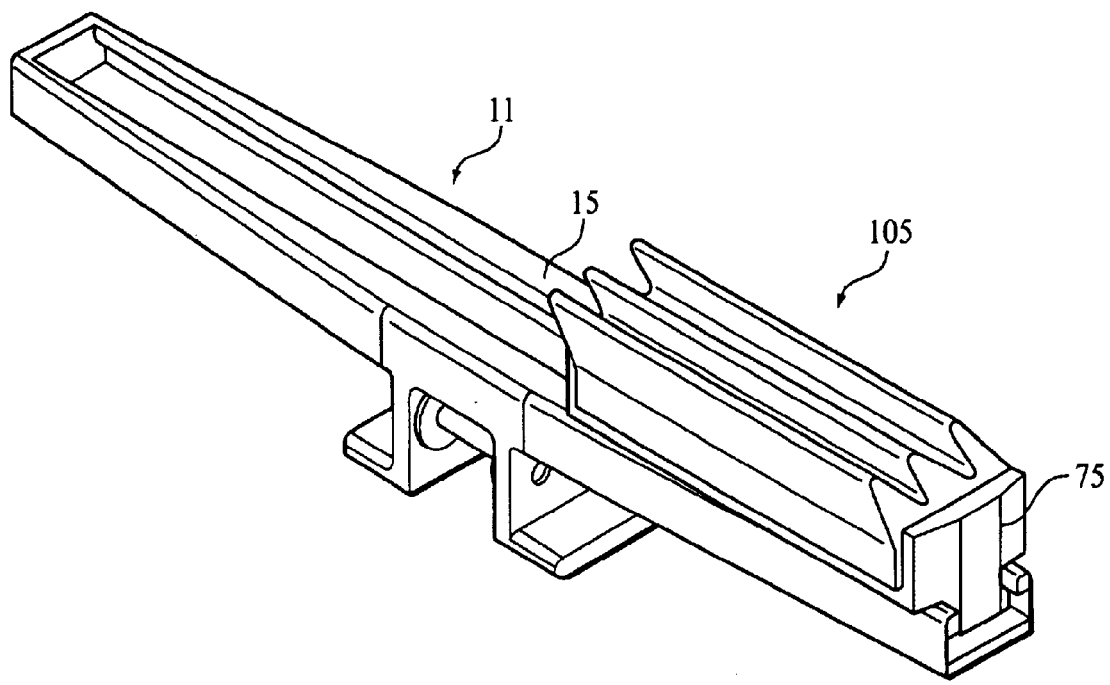
FIG. 7 is a perspective view of chain link 10' having the movable gripper slidingly engaged thereon.

In another embodiment, the present invention provides for a conveyor chain link having a movable gripper 11 (hereinafter referred to as "combination link/gripper 11"). In this embodiment, combination link/gripper 11 includes body 15 as described above and further comprises a slider member 75 that is in sliding engagement with body 15 as shown in FIG. 7. As shown in FIGS. 8A–8C, the bottom portion 80 of slider member 75 is provided with a cooperating structure that engages the groove or channel 70 in body 15 to permit slider member 75 to move along or parallel to axis A relative to body 15. Cooperating structure may be a key or tongue member 85 that extends longitudinally along a substantial portion of the length of slider member 75 and inter-engages with groove or channel 70. Although the preferred cooperating structure defines a key or tongue, other receiving structures are within the scope of the present invention including, but not limited to, a tab, rail, or other male structure. This inter-engaging relationship permits sliding movement by slider member 75 relative to body 15. Preferably, the key or tongue member 85 has a T-shaped profile; however, the profile of the key or tongue member 85 may take the form of any shape so long as the cooperating structure permits sliding movement of slider member 75 along or parallel to axis A relative to body 15 and captures body 15 such that body 15 is constrained from moving in a direction perpendicular to axis A. It is important to note that other sliding structures contemplated within the present invention includes a roller/track assembly, male/female slides, rack and pinion, and other slide structures known in the art.

Alternatively, the forms of the structure disposed in or on body 15 and the cooperating structure disposed in or on sliding member 75 may be reversed. In this embodiment, the structure disposed in or on body 15 may take the form of a key or tongue member 85 that extends from the top portion 65 of body 15 longitudinally along a substantial portion of the length of body 15. Accordingly, the cooperating structure disposed in or on sliding member 75 would take the form of a recessed groove or channel 85 that extends longitudinally along a substantial portion of the length of slider member 75. In this embodiment, one skilled in the art would recognize that body 15 and slider member 75 would need to be slightly modified to permit such an alternative embodiment. However, this modification could be easily made by one skilled in the art and therefore is within the scope of the present invention.

As shown in FIGS. 8A–8C, slider member 75 further comprises means for retaining a gripper on slider member 75. Preferably, these retaining means includes a pair of opposed retaining members 90, 91 that extend from the top portion 94 of slider member 75. Each retaining member includes a first portion 92, 93, which is substantially perpendicular to the top portion 94 of said sliding member 75, and a second portion 95, 96, which is substantially parallel to the top portion 94 of said sliding member 75. Each second portion 95, 96 of retaining members 90, 91 projects inward towards each other. Although the preferred retaining means are the retaining members 90, 91 as described above, one skilled in the art would appreciate that other retaining means are possible such as posts, angled members, or clips and are within the scope of the present invention.

Figure 9A:
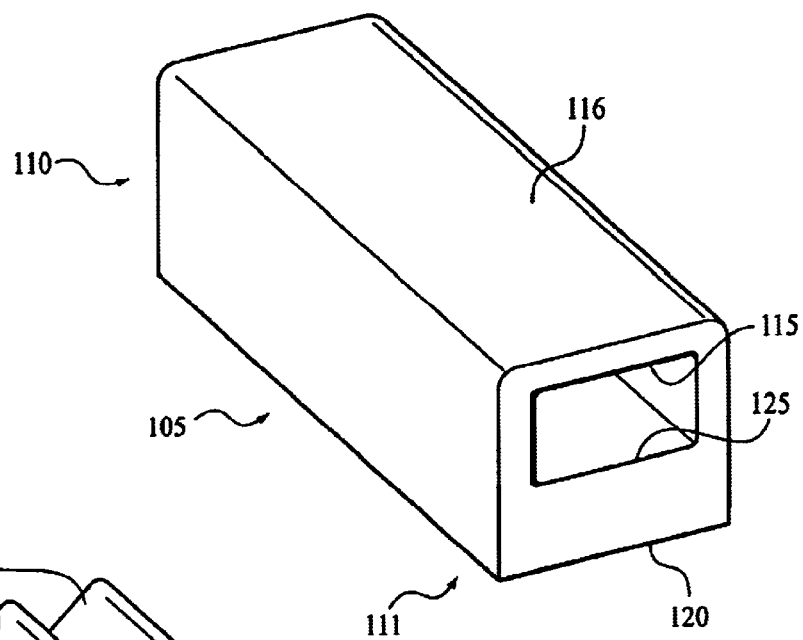
FIG. 9A is a perspective view of gripper 105 according to the present invention.
Figure 9B:
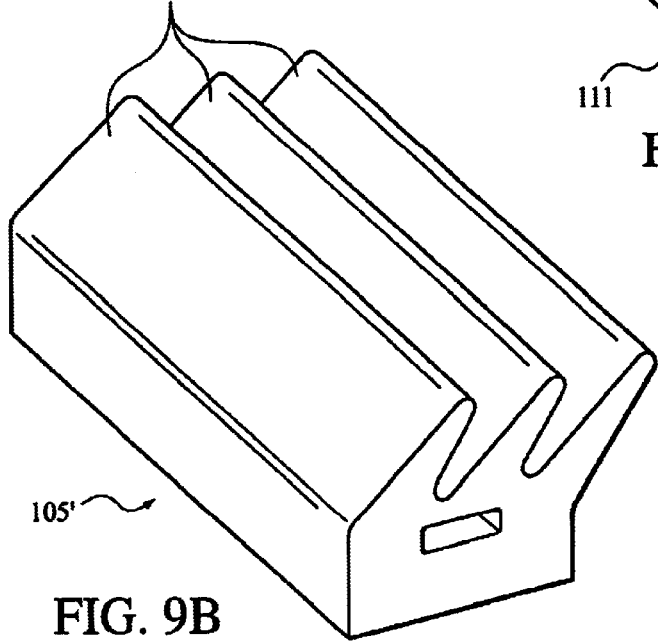
FIG. 9B is a perspective view of an alternate embodiment of gripper 105' according to the present invention.

As stated above, sliding member 75 includes means for retaining a gripper on slider member 75. As shown in FIG. 9A, gripper or gripping member 105 may be more specifically referred to as a resilient, hollow, tubular gripping member, the function of which is to grip the articles to be carried by the product capturing conveyor. Gripper 105 may be made of any suitable resilient material, particularly of a urethane, rubber, or other suitable material. Gripper 105 is approximately the same length as sliding member 75, and it is retained on sliding member 75 by retaining members 90, 91. Gripper 105 has first and second ends 110, 111 and inner and outer surfaces 115, 116. Outer surface 116 of the gripping member 12 includes a flattened outer surface portion 120, which lies against the generally flat top surface 94 of sliding member 75. The remainder of outer surface 116 may have a number of different shapes, depending on the articles to be conveyed. Many shapes of grippers are already known in the art. In this embodiment, the remainder of outer surface 116 is semi-circular in shape; however, lengthwise ribs 130 (see gripper 105' in FIG. 9B) and various other shapes are also contemplated by this invention. The inner surface 115 of gripper 105 also has a flattened surface 125, which is opposite the flattened outer surface portion 120. This flattened inner surface portion 125 has a width which is approximately the same width as the opposed retaining members 90, 91, so that the members 90, 91 contact this flattened inner surface portion 125 for retaining gripper 105 on sliding member 75.

Figure 9C:
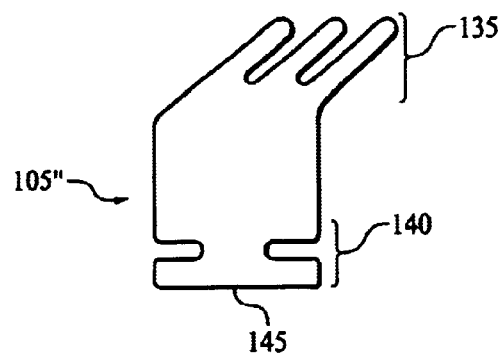
FIG. 9C is a perspective view of an alternate embodiment of a gripper 105" according to the present invention.

Illustrated in FIG. 9C is another embodiment of a gripper 105" that is unitary in construction where the top portion 135 is preferably made of a softer material for handling articles and the base portion 140 is preferably made of a harder material that is in sliding engagement with body. The base portion 140 of gripper 105" may be provided with a male structure such as a tab, tongue, or rail 145 to slidably engage groove or channel in body 15 in the manner as described above. Alternatively, the base portion of gripper 105" may be provided with a female structure such as a groove or channel to slidably engage the tab, tongue, or rail in body 15 in the manner as described above.

Preferably, retaining members 90, 91 are centrally located on sliding member 75 and occupy approximately one-third of the width thereof. This arrangement of the retaining members is thought to provide the best retention while still leaving sufficient thickness to the gripper so that it can function effectively. The retaining members 90, 91 wrap around their respective ends 110, 111 of gripper 105 and project inside the hollow portion of gripper 105 to retain it on sliding member 75. Accordingly, because sliding member 75 is movable relative to body 15, gripper 105 is thereby movable in a direction along or parallel to axis A relative to body 15.

Figure 10:
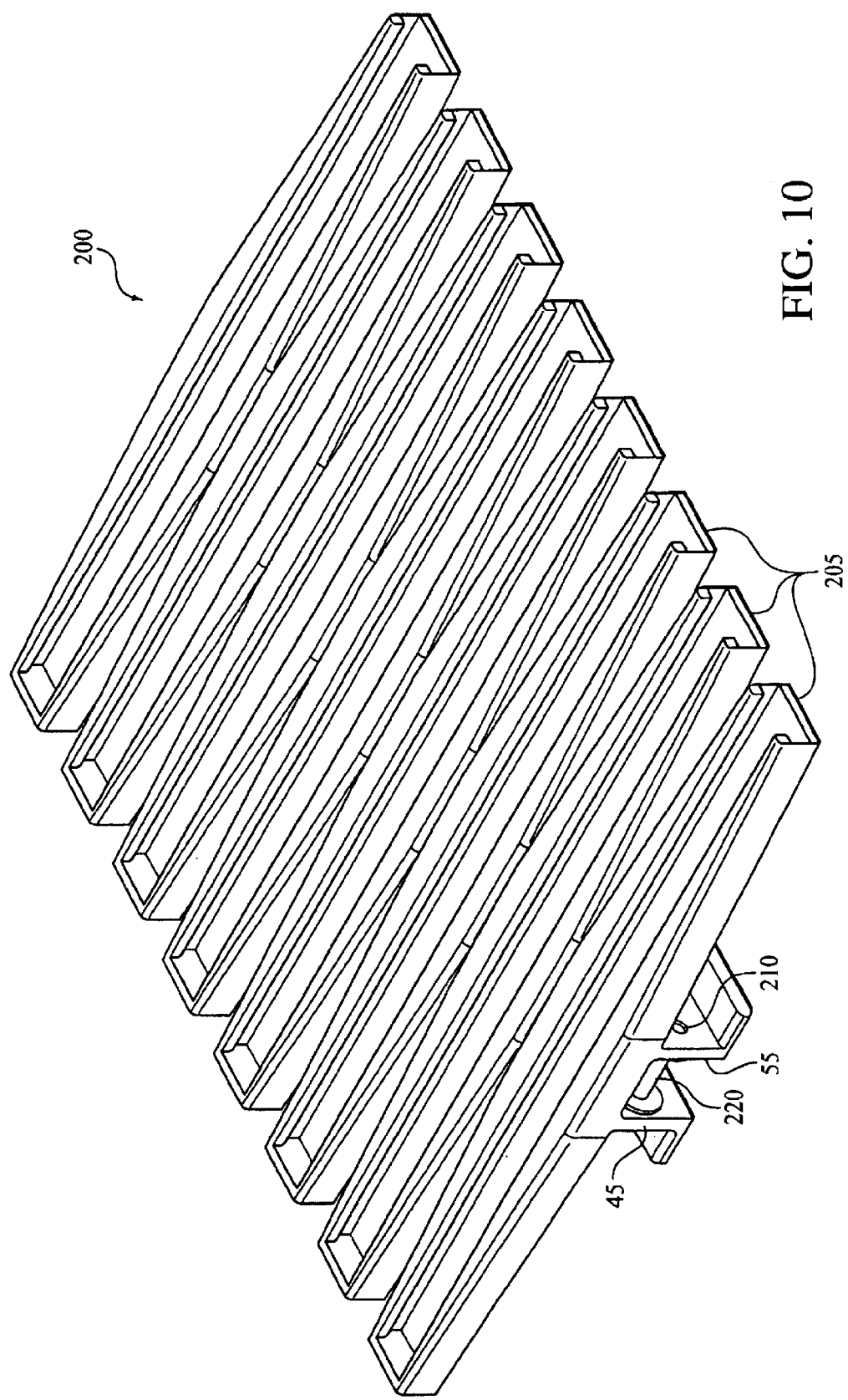
FIG. 10 is a perspective view of chain 200 comprising a plurality of links 10 according to the present invention.
Figure 11:
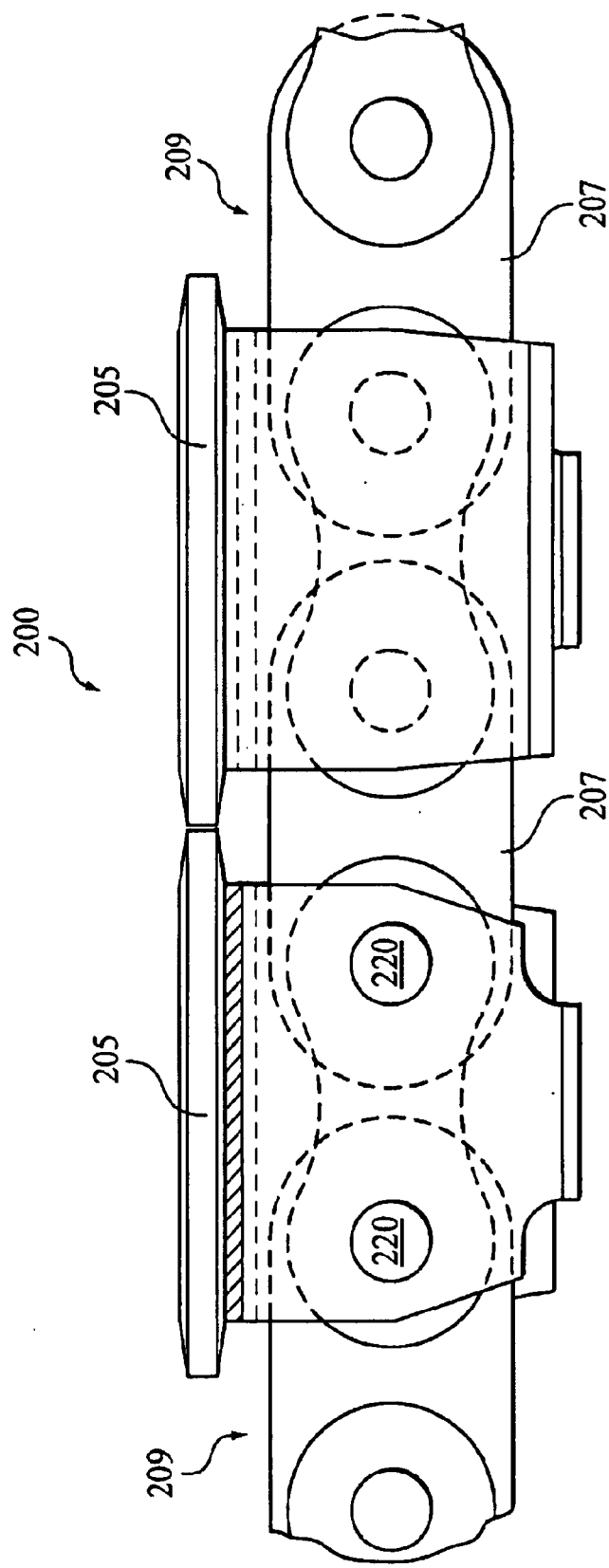
FIG. 11 is a side view of chain 200 illustrating the interconnection of chain 207 to links 205.

In another embodiment, the present invention provides for a conveyor chain 200 having a plurality of chain links as shown in FIG. 10. In this embodiment, chain 200 comprises a plurality of links 205 interconnected to each other by a connector plate 207 that is integral with chain 209. Links 205 are structurally the same as links 10 shown and described above. To provide a connection between each link 205, two pairs of holes 210, 215 are provided in both first portions 45, 55 of guide shoes 30, 35 (see FIG. 5D and FIG. 11). Hole 210 in first portion 45 is concentric with hole 210 in first portion 55 and hole 215 in first portion 45 is concentric with hole 215 in first portion 55. Thus, each pair of holes 210, 215 are capable of receiving a pin 220 that comprises part of chain 209 to thereby mount each link 205 to chain 209. Connector plate 207 include two holes for receiving pins 220, but are staggered thereby bridging each link 205 together.

In another embodiment, the present invention provides for a conveyor 300 utilizing a chain link having a movable gripper according to the present invention. A typical product capturing conveyor system comprises a pair of endless conveyors as shown and described in U.S. Pat. No. 4,423, 745 which is hereby incorporated in its entirety herein. In a typical conveyor system, the conveyor system comprises a conveyor that includes a chain having a plurality of chain links that follows a track defining a travel path. The track includes a metal link chain that is coupled to a sprocket which in turn is coupled to a motor that drives the chain.

As stated above, as shown in FIG. 4, inherent to the function of inverting bottles 10 with turning wheels 12 or a curved track is the geometric problem involved in the inversion. As the chain follows the contour of the turning wheel 12 or curved track, the vertical centerlines 14 of the bottles 10 align themselves to point at the axis of rotation of the turning wheel 12. And because bottles 10 are gripped/constrained at about their midpoint during movement around the turning disc 12, the distance between their vertical centerlines increases at points further from the center of the turning wheel 12 or curved track and decreases at points nearer the center of the turning wheel 12 or curved track. Therefore, if bottles 10 enter the rinser "body-to-body" (aligned touching each other with vertical centerlines parallel), the portion of the bottles 10 closer to the center point of the turning wheel 12 or curved track will interfere with one another causing crunching, denting, or damage as shown in FIG. 4.

In another embodiment, a conveyor system for moving articles comprises a conveyor including a chain having a plurality of links that follows a track defining a travel path. The travel path includes a curved portion having a radius of curvature defining a center point. Each link has a gripping member in sliding engagement with the link wherein the gripping member is movable relative to the link. Each link includes means for supporting the link in said track wherein the link follows the travel path of the track. The chain includes a proximal portion that is closer to the center point of the curved portion and a distal portion that is farther from the center point of the curved portion wherein the proximal portion defines a contraction zone and the distal portion defined an expansion zone when the chain travels around the curved portion. The conveyor system includes means for moving each gripping member into the expansion zone before each respective link travels along the curved portion of said track.

The present invention also provides for a conveyor system comprising a conveyor including a chain having a plurality of links that follows a track defining a travel path. The track includes a curved portion such a turning wheel or curved track having a radius of curvature defining a center point. Each link includes means for supporting the link in the track wherein the link follows the travel path of the track. Each link also includes a gripping member that is in sliding engagement with the link wherein the gripping member is movable relative to the link. The conveyor system further comprises an urging mechanism positioned along the track to move each gripping member in a direction relative to the center point of the curved portion when each gripping member reaches the urging mechanism. The urging mechanism may comprise a guide bar to move the gripper member in a direction relative to the track and/or relative to the center point of the curved portion. Preferably, the guide bar is positioned along a portion of the track before the curved portion to move the gripper members in a direction away from the center point of the curved thereby moving the gripping members entirely in the expanded zone prior to reaching the curved portion of the track. This will ensure that no "bottle crunching" takes place as the bottles travel around the curved surface. The guide bar may extend around the perimeter of the curved portion of the track to maintain the gripper member in the expanded position. The urging mechanism may comprises a cam positioned adjacent the curved portion of the track and the gripping member defines the cam follower. Alternatively, a member may extend from the gripper defining the cam follower.

Figure 12:
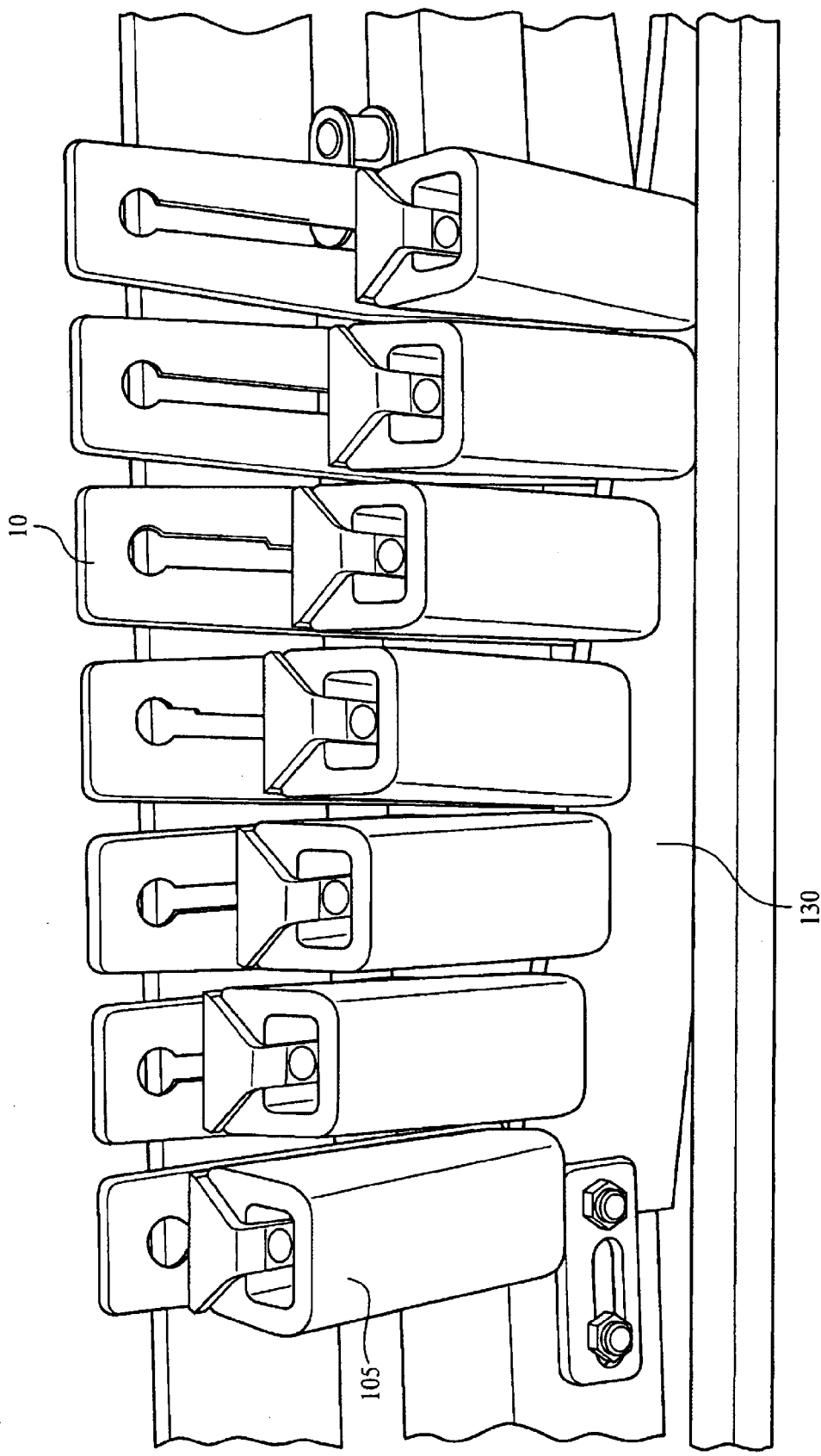
FIG. 12 illustrates link 10 and gripper 105 moving along guide 130 where gripper 105 is urged in the direction of arrow A as it moves along guide bar 130.
Figure 13:
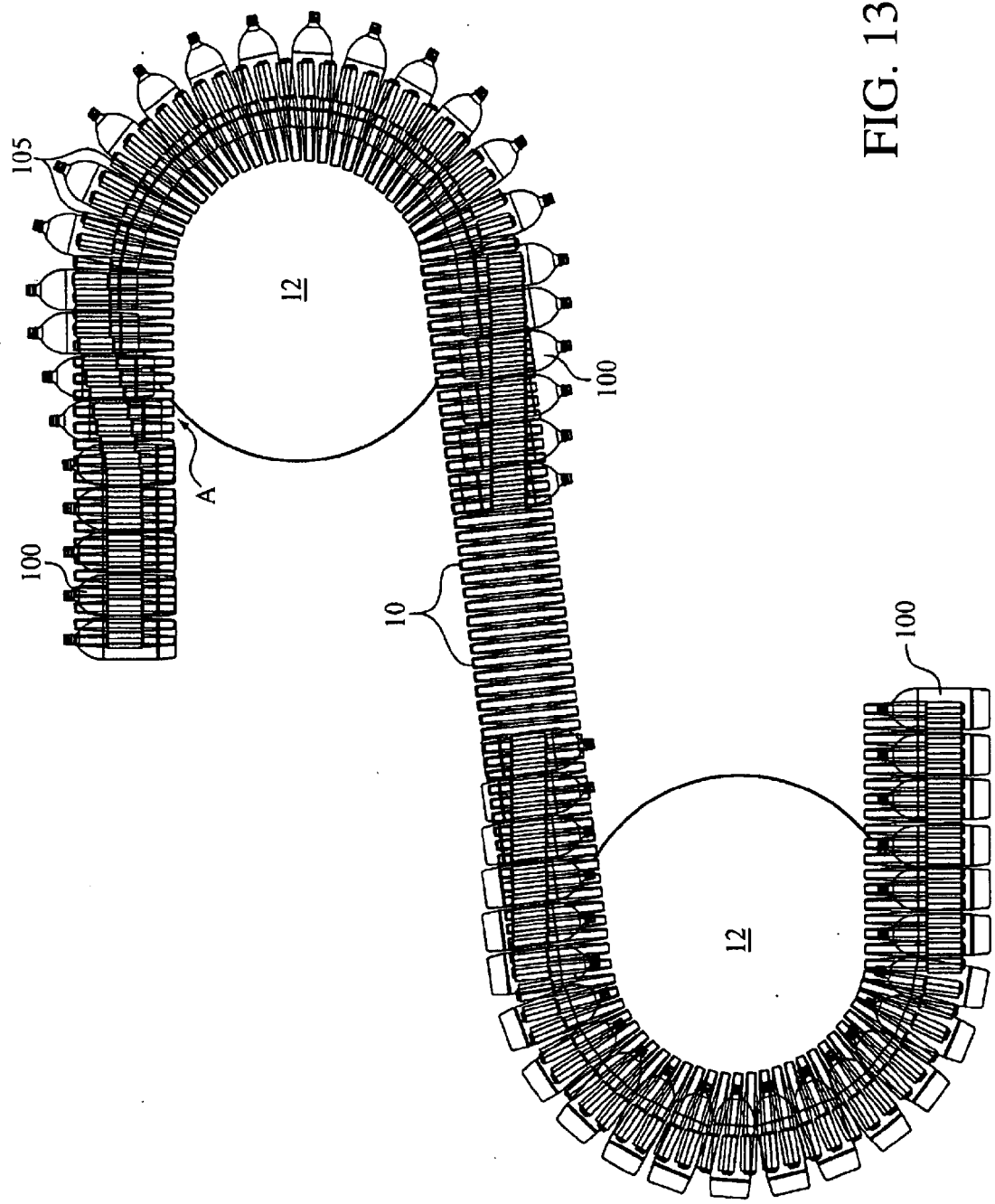
FIG. 13 illustrates the gripper chain of this invention is shown in use on a high-in, low-out rinser conveyor.
Figure 14:
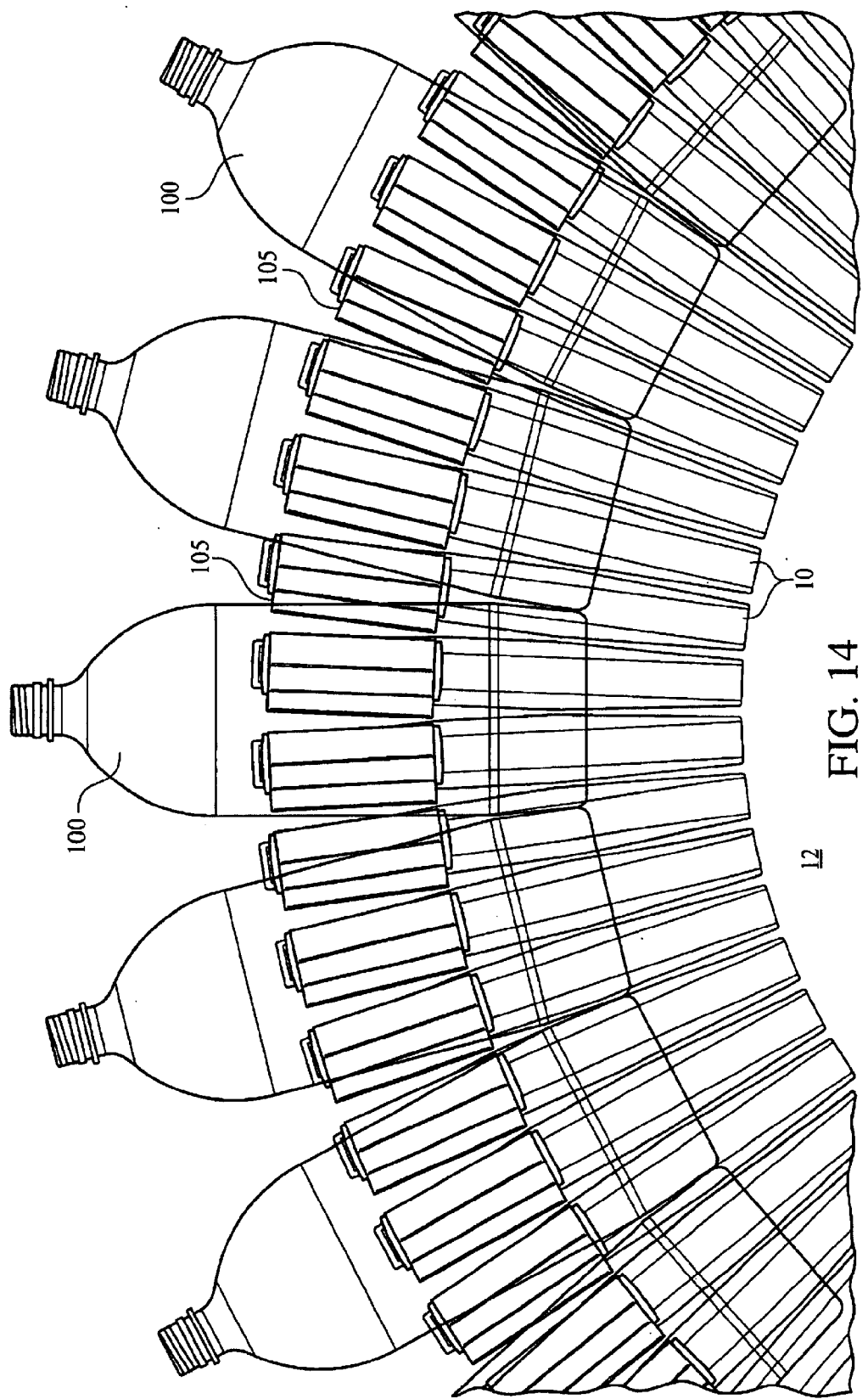
FIG. 14 illustrates bottles 100 captured by gripper 105 where the grippers 105 are entended into the expansion zone as they are going around the curved portion of the track.
Figure 15:
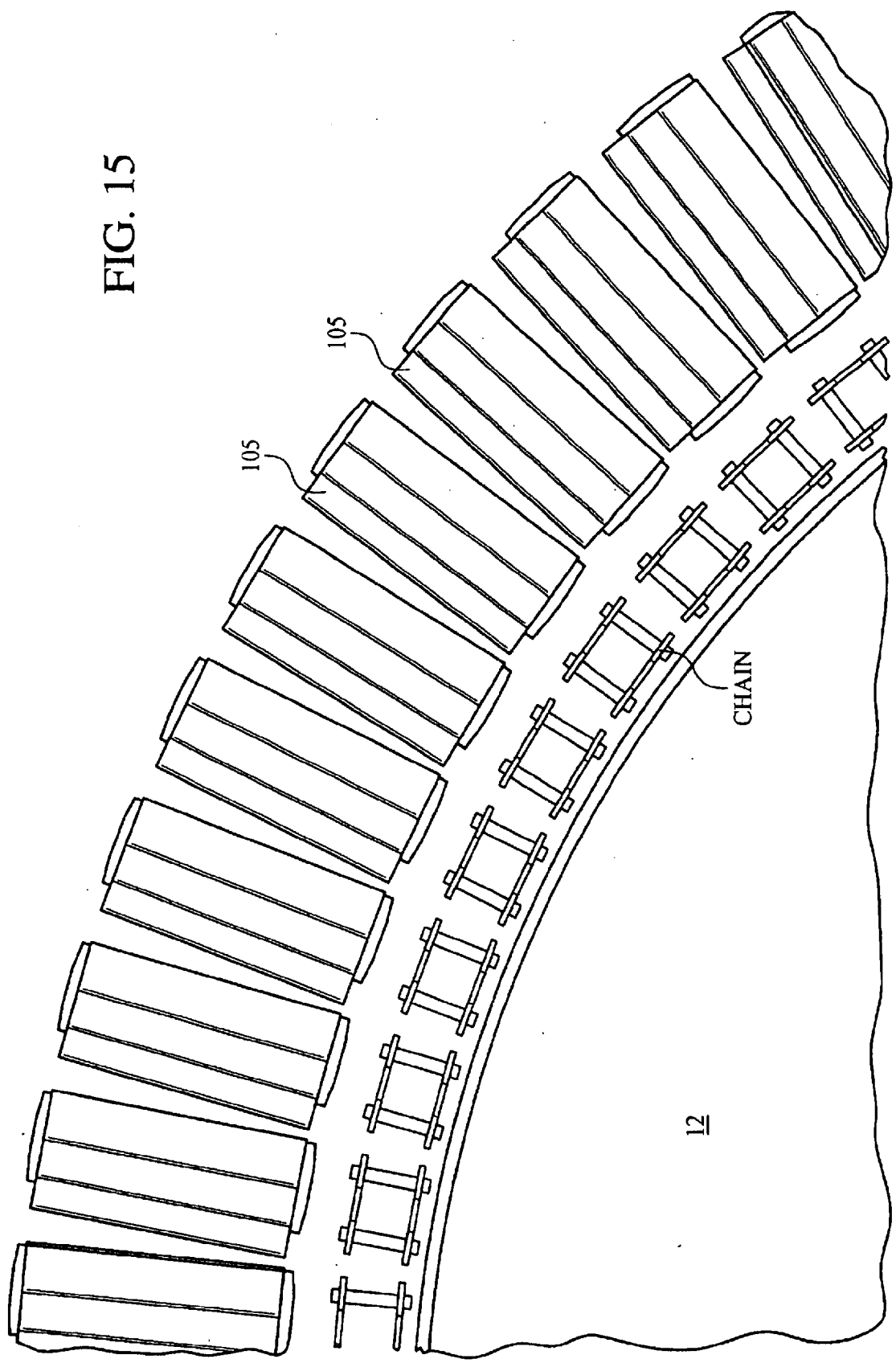
FIG. 15 illustrates FIG. 14 subtracting out the links 10 and the bottles 100.
Figure 16:
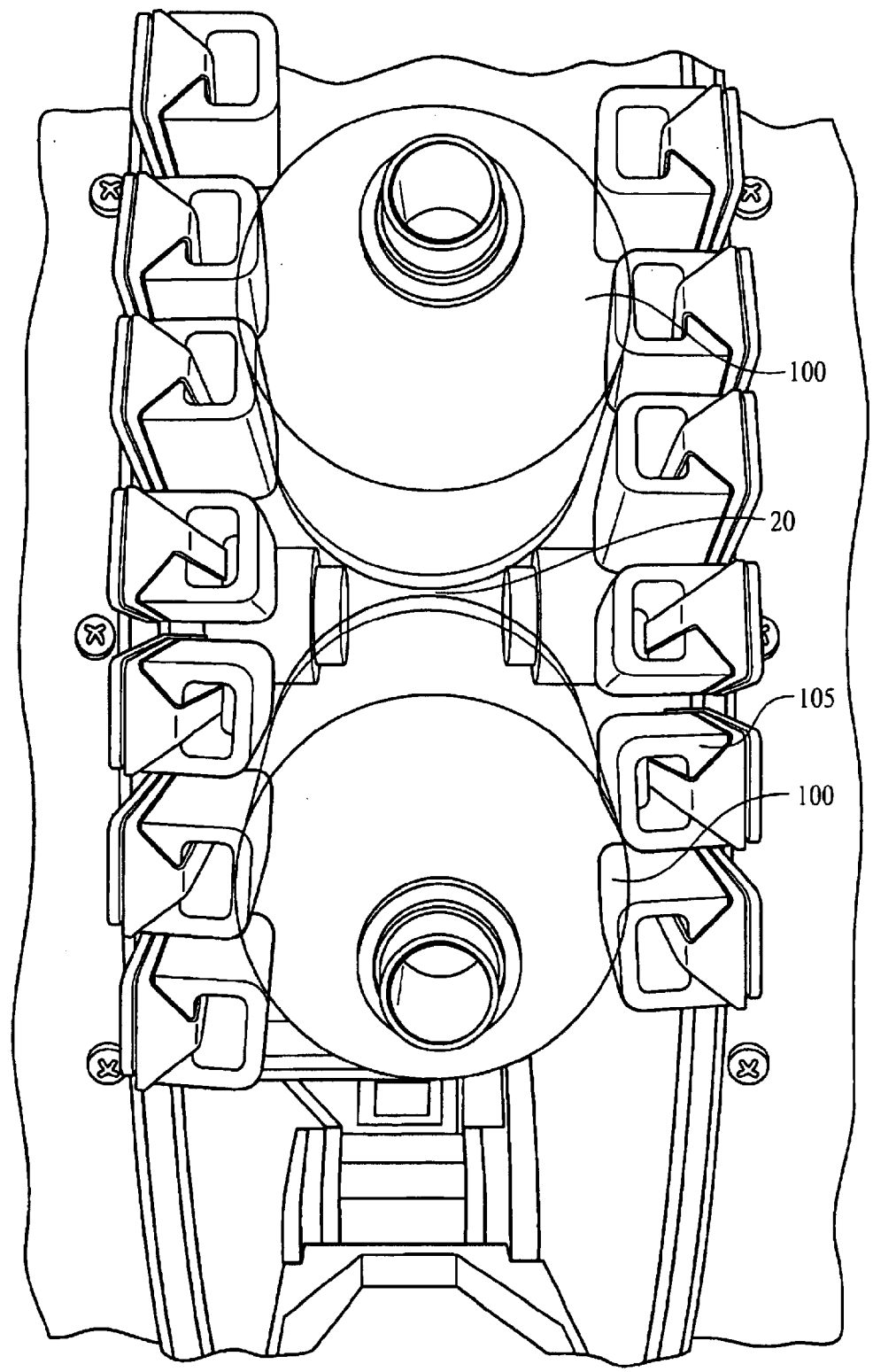
FIG. 16 illustrates a front view of bottles 100 as they are going around a curved portion where the grippers 105 are extended into the expansion zone and supplies gap 20 between bottles 100.

The present invention improves over the prior art by allowing the gripper to slide along the longitudinal body of the link and move in an outward direction relative to the axis of rotation. FIG. 12 shows grippers 105 in different stages of movement from the centerline of link 10 as they travel along guide bar 130. This allows gripper 105 to slidably extend into the "expansion zone" relative to link 10 when traveling along the turning wheel 12. As shown in FIG. 13, the gripper chain of this invention is shown in use on a high-in, low-out rinser conveyor. Bottles 100 are aligned side-by-side on the gripper chain (with no gapping) as they enter the first turning wheel 12. As the gripper chain enters the turning wheel 12 on the larger radius, the grippers 105 slide along the link 10 radially outwardly from the turning wheel 12 (as shown in "A"), thereby increasing the centerline distance of the bottles 100. Such movement of the gripper 105 could be induced by any means necessary, including a guide bar, camming means 135, magnetics, vacuum, gravity, etc. Therefore, the centerline distance for each bottle 100 is increased around the circumference of the turning wheel 12 due to the gripper 105 moving the bottle 10 further into the "expansion zone" and the flight and chain maintaining their orientation. Thus, as seen in FIGS. 14 and 15, the distance between the centerlines of each bottle increases as the bottle is moved further into the "expansion zone". Preferably, gripper 105 will extend far enough into the "expansion zone" that the bottom of the bottles 100 will not interfere with each other during movement around the turning wheel 12 as shown in FIG. 14. Also, FIG. 16 shows a view looking toward the axis of rotation of the turning wheel of adjacent bottles as they are moved along the turning wheel using the present invention. Note that there is a gap 20 between each bottle even at the base of the bottles 100, thereby eliminating the risk of damage to the bottles. The movement of gripper 105 along the link 10 is identical when the bottles enter a turning wheel in an inverted manner. Thus, this invention eliminates the interference caused when bottles enter the rinser's turning disc body-to-body on a chain with grippers fixed to the centerline of the chain.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A chain link for use in a product capture conveyor system having a pair of endless conveyors that convey products therebetween, said product capture conveyor system having a track and an urging mechanism positioned along said track, said chain link comprises:
   an elongated body having opposed first and second ends defining a longitudinal axis therebetween; and
   a gripping member configured to move relative to said elongated body in a direction parallel to said longitudinal axis of said elongated body when said gripping member confronts said urging mechanism.

2. The chain link of claim 1, wherein said gripping member includes a base portion, said base portion of said gripping member having a female structure that is in sliding engagement with a cooperating male structure along said elongated body.

3. The chain link of claim 2, wherein said cooperating structure substantially constrains said base portion against movement in a direction perpendicular to said longitudinal axis.

4. The chain link of claim 2, wherein said cooperating structure defines a groove extending parallel to said longitudinal axis of said elongated body and said structure comprises a tongue member extending from said base portion of said gripping member that engages said groove.

5. The chain link of claim 4, wherein said groove defines a T-shaped profile and said tongue member defines a corresponding T-shaped profile.

6. The chain link of claim 2, wherein said female structure defines a channel disposed in said base portion and said cooperating male structure comprises a rail extending parallel to said longitudinal axis of said body that engages said channel.

7. The chain link of claim 1, wherein said gripping member is of unitary construction.

8. The chain link of claim 2, wherein said base portion of said gripping member comprises means for retaining said gripping member.

9. The chain link of claim 8, wherein said means for retaining said gripping member comprises first and second retaining members respectively extending from a first and second end of said base portion, said first and second retaining members respectively projecting inside opposing first and second openings of said gripping member for retaining said gripping member on said base portion.

10. The chain link of claim 9, wherein each of said retaining members includes a first portion substantially perpendicular to said base portion and a second portion substantially parallel to and spaced from said base portion.

11. The chain link of claim 1, wherein said elongated body has means projecting from a bottom portion of the elongated body for supporting said chain link on a track.

12. The chain link of claim 11, wherein said means for supporting said link on said track comprises a pair of guide shoes that extend from the bottom portion of said body.

13. The chain link of claim 12, wherein each of said guide shoes includes a first portion that extends from said bottom portion in a direction substantially perpendicular to said bottom portion and a second portion that extends from said first portion in a direction substantially parallel to and spaced from said bottom portion.

14. A chain link for use in a conveyor system, said conveyor system having a pair of closed loops of chains each defining a travel path, the two closed loops of chains being oriented to include sections which extend parallel to and closely spaced from one another to form a conveyor channel therebetween, said conveyor system includes an urging mechanism provided along each of said closed loops of chains, said chain link comprising:
   a carrier member having a top portion and a longitudinal axis; and
   a gripper slidably engaged with said top portion of said carrier member, said gripper being movable with respect to said carrier member along the longitudinal axis of said carrier member when said gripper contacts said urging mechanism.

15. The chain link of claim 14, wherein said carrier member has a bottom portion, said bottom portion includes means for supporting said chain link on a track.

16. The chain link of claim 14, wherein said top portion of said carrier member includes a groove that extends along at least a portion of the length of said carrier member.

17. The chain link of claim 16, wherein said gripper includes a base portion having a corresponding tongue to engage said groove in said carrier member.

18. The chain link of claim 14, wherein said gripper includes a base portion having a groove that extends along at least a portion of said base portion of said gripper.

19. The chain link of claim 18, wherein said top portion of said carrier member has a corresponding tongue that extends along at least a portion of the length of said carrier member to engage said groove in said base portion of said gripper.

20. A conveyor system for moving articles comprising:
   a conveyor including a chain having a plurality of links that follows a track defining a travel path, said travel path includes a curved portion having a radius of curvature defining a center point,
   each link having a gripping member in sliding engagement with said link wherein said gripping member is movable relative to said link, each link having means for supporting said link in said track wherein said link follows said travel path of said track,
   said chain includes a proximal portion that is closer to said center point of said curved portion and a distal portion that is farther from said center point of said curved portion, said proximal portion defines a contraction zone and said distal portion defines an expansion zone when said chain travels around said curved portion; and
   means for moving each gripping member into said expansion zone before each respective link travels along said curved portion of said track.

21. A conveyor system comprising:
   a conveyor including a chain having a plurality of links that follows a track defining a travel path, said track includes a turning wheel having a radius of curvature defining a center point,
each link having means for supporting said link in said track wherein said link follows said travel path of said track and a gripping member in sliding engagement with said link wherein said gripping member is movable relative to said link, and
an urging mechanism positioned along said track to move each gripping member in a direction relative to the center point of said curved portion when each gripping member reaches said urging mechanism.

22. A product capture conveyor system comprising:
a conveyor including a chain having a plurality of links that follows a track defining a travel path, said track includes a curved portion having a radius of curvature defining a center point,
each link having means for supporting said link in said track wherein said link follows said travel path of said track and a gripping member in sliding engagement with said link wherein said gripping member is movable relative to said link, and
a guide bar positioned along said track to move each gripping member in a direction relative to the center point of said curved portion when each gripping member reaches said guide bar.

23. The conveyor system of claim 22, wherein said guide bar is positioned along a portion of said track before said curved portion to move said gripping member in a direction away from the center point of said curved thereby moving said gripping member to an expanded position.

24. The conveyor system of claim 23, wherein said guide bar extends around the perimeter of said curved portion of said track to maintain said gripping member in said expanded position.

25. A product capture conveyor system comprising:
a conveyor including a chain having a plurality of links that follows a track defining a travel path, said track includes a curved portion having a radius of curvature defining a center point,
each link having means for supporting said link in said track wherein said link follows said travel path of said track and a gripping member in sliding engagement with said link wherein said gripping member is movable relative to said link, and
a cam positioned adjacent said track to move each gripping member in a direction relative to the center point of said curved portion when each gripping member reaches said cam, said gripping member defines a cam follower.

26. A product capture conveyor system comprising:
a conveyor including a chain having a plurality of links that follows a track defining a travel path, said track includes a curved portion having a radius of curvature defining a center point,
each link includes a carrier having a longitudinal axis and a gripping member in sliding engagement with said carrier wherein said gripping member is movable relative to said carrier member, and
means for urging said gripping member along said longitudinal axis of said carrier when said gripping member confronts said urging means, said urging means includes a guide bar positioned along said track.

27. The conveyor system of claim 26, wherein at least a portion of said guide bar is positioned along a portion of said track before said curved portion to move said gripping member in a direction away from the center point of said curved thereby moving said gripping member to an expanded position of said chain.

28. The conveyor system of claim 27, wherein said guide bar extends around the perimeter of said curved portion of said track to maintain said gripping member in said expanded position of said chain.

29. A conveyor system for moving articles comprising:
a track including one or more curved portions each having a radius of curvature defining a center point;
a plurality of links that follow said track,
each link includes a proximal portion and a distal portion relative to said center point of said curved portion of said track, said proximal portion defines a contraction zone and said distal portion defines an expansion zone when each link travels around said curved portion of said track;
each link having a gripping member configured to be movable relative to its respective link between the contraction zone and the expansion zone; and
means for urging each gripping member towards said expansion zone of its respective link, said urging means being positioned along said track.

30. The conveyor system of claim 29, wherein said urging means is positioned adjacent said curved portion of said track.

31. The conveyor system of claim 29, wherein said urging means includes a guide bar positioned adjacent said track.

* * * * *